United States Patent [19]  [11] Patent Number: 4,797,162
Spietschka et al.  [45] Date of Patent: Jan. 10, 1989

[54] PROCESS FOR THE PREPARATION OF PERYLENE-3,4,9,10-TETRACARBOXYLIC ACID N,N'-DIMETHYLIMIDE IN A HIGH-HIDING PIGMENTARY FORM

[75] Inventors: Ernst Spietschka, Idstein; Manfred Urban, Wiesbaden, both of Fed. Rep. of Germany

[73] Assignee: Hoechst Aktiengesellschaft, Frankfurt am Main, Fed. Rep. of Germany

[21] Appl. No.: 883,086

[22] Filed: Jul. 8, 1986

[30] Foreign Application Priority Data

Jul. 10, 1985 [DE] Fed. Rep. of Germany ....... 3524535

[51] Int. Cl.$^4$ .................... C09B 67/20; C07D 471/06
[52] U.S. Cl. ........................................ 106/498; 546/37
[58] Field of Search ............. 546/37; 106/288 Q, 309

[56] References Cited

U.S. PATENT DOCUMENTS 3,615,800 10/1971 Spietschka et al. ............. 106/288 Q
3,976,649 8/1976 Fabian et al. ................ 106/288 Q X
4,018,791 4/1977 Spietschka et al. ................. 540/137
4,189,582 2/1980 Hoch et al. ............................ 546/37
4,496,731 1/1985 Spietschka et al. .................. 546/37

OTHER PUBLICATIONS

Herbst, Willy: Industrielle Organische Pigmente: Herstellung, Eigenschaften, Anwendung/Willy Herbst; Klaus Hunger–Weinheim: VCH, 1987.

Primary Examiner—Donald G. Daus
Assistant Examiner—William A. Teoli, Jr.

[57] ABSTRACT

A process for the preparation of perylene-3,4,9,10-tetracarboxylic acid N,N'-dimethylimide in a high-hiding pigmentary form and a pure red shade, in which a finely divided, dry perylene-3,4,9,10-tetracarboxylic acid, N,N'-dimethylimide prepigment which is prepared in a conventional manner and has a crystallite size of <400 Å is treated with an organic solvent which is liquid in the treatment temperature range stated below and is selected from the series comprising saturated aliphatic brominated or chlorinated hydrocarbons, aromatic hydrocarbons and aromatic brominated or chlorinated hydrocarbons, in a mill or a disperser at temperatures from 0° C. to 100° C., the organic solvent is then distilled off and the perylene-3,4,9,10-tetracarboxylic acid N,N'-dimethylimide pigment is isolated.

3 Claims, No Drawings

PROCESS FOR THE PREPARATION OF PERYLENE-3,4,9,10-TETRACARBOXYLIC ACID N,N'-DIMETHYLIMIDE IN A HIGH-HIDING PIGMENTARY FORM

The invention relates to a process for the preparation of perylene-3,4,9,10-tetracarboxylic acid, N,N'-dimethylimide in a high-hiding pigmentary form, by means of which process high-hiding, red and pure shades are obtained after incorporation of the pigment into finishes.

To obtain red solid shades in finishes, combinations of inorganic pigments (such as, for example, iron oxide pigments) and high-hiding red organic pigments are used in practice. For economic and tinctorial reasons, the organic pigment is required to possess very high covering power in conjunction with as thin a coating film as possible, outstanding rheological properties and a very pure shade. Of course, very high requirements are set in respect of weather-fastness.

For the preparation of perylene-3,4,9,10-tetracarboxylic acid, N,N'-dimethylimide in pigmentary form, the following processes are kown. U.S. Pat. No. 4,018,791 describes a process in which very pure pigments are obtained by converting the crude pigments, for example the crude perylene-3,4,9,10-tetracarboxylic acid, N,N'-dimethylimide, with sulfuric acid to the sulfate, isolating the latter, liberating the pure product from it by hydrolysis, separating off the pure product and milling the moist crude pigment in a liquid medium. According to European Patent No. 0 088 392 (U.S. Pat. No. 4,496,731), transparent perylene-3,4,9,10-tetracarboxylic acid N,N'-dimethylimide pigments, in particular for metallic finishes, are obtained by reacting perylene-3,4,9,10-tetracarboxylic dianhydride in aqueous suspension with methylamine to give the bis-(alkylammonium) salt of perylene-3,4,9,10-tetracarboxylic acid bis-N-alkylamide, precipitating the latter as a sparingly soluble metal salt by adding metal ions, and carrying out the cyclization reaction with the said salt to give perylene-3,4,9,10-tetracarboxylic acid N,N'-dimethylimide at elevated temperature. The known pigment conditioning processes, as described in U.S. Pat. No. 4,018,791 and European Patent No. 0 088 392 (U.S. Pat. No. 4,496,731) lead to pigments which, when used in finishes, give transparent and deep colorations and are therefore unsuitable for the desired purpose.

It has now been found that perylene-3,4,9,10-tetracarboxylic acid N,N'-dimethylimide can be prepared in a high-hiding pigmentary form and with a pure red shade by a method in which a finely divided, dry perylene-3,4,9,10-tetracarboxylic acid N,N'-dimethylimide pigment prepared in a conventional manner and having a crystallite size of <400 Å is treated with an organic solvent which is liquid in the treatment temperature range stated below and is selected from the series comprising saturated aliphatic brominated, preferably chlorinated, hydrocarbons, such as methylene chloride, aromatic hydrocarbons, such as toluene, xylenes or 1,2,3-trimethylbenzene (hemimellitol), 1,2,4-trimethylbenzene (pseudocumene) or 1,3,5-trimethylbenzene (mesitylene), and aromatic brominated, preferably chlorinated, hydrocarbons, such as chlorobenzene, o-dichlorobenzene, 1,2,4-trichlorobenzene or bromobenzene, in a mill or a disperser at temperatures from 0° C. to 100° C., preferably 20° C. to 30° C., the organic solvent is then distilled off and the pigment is isolated in a conventional manner.

The treatment, according to the invention, of the prepigment can be carried out, for example, in continuous or batchwise roll mills, vibratory mills or stirred ball mills.

The coatings produced using the pigment obtained according to the invention have very high hiding power and do not exhibit any bronzing. It could not be foreseen that finely divided prepigments which, as described above, can be converted to highly transparent metallic pigments, could be converted to high-hiding pigments by treatment with organic solvents of the stated type in a mill or a disperser which is normally used for comminution. This is all the more surprising since, when the solvent treatment is carried out without a mill or disperser, the desired hiding power is not obtained and the shade of the pigment becomes very opaque.

The dry, finely divided prepigment of perylene-3,4,9,10-tetracarboxylic acid N,N'-dimethylimide, which is treated by the process, can be prepared, for example, by the processes described in German Offenlegungsschrift No. 2,540,739 (British Patent No. 1,463,141), German Offenlegungsschrift No. 2,727,484 (U.S. Pat. No. 4,189,582), German Offenlegungsschrift No. 2,153,087 (British Patent No. 1,370,433), European Patent No. 00 88 392 (U.S. Pat. No. 4,496,731) and German Auslegeschrift No. 2,316,536 (U.S. Pat. No. 3,976,649).

EXAMPLE 1

30 g of perylene-3,4,9,10-tetracarboxylic dianhydride are introduced into 300 ml of water. After the mixture has been cooled to 0°–5° C., 47.1 g of a 42.5% strength aqueous monomethylamine solution are added dropwise in the course of 10 minutes. Stirring is then continued for 15 minutes at 0°–5° C., after which a solution of 17 g of calcium chloride in 56.6 ml of water is added dropwise, stirring is continued for 1 hour at 0°–5° C., and the mixture is heated to the boil for 2 hours and allowed to cool to 50° C. Thereafter, the pH is brought to 7–7.5 by adding 13.8 g of formic acid (98% strength), and the precipitate is filtered off under suction, washed chloride-free and dried at 80° C.

32.2 g of perylene-3,4,9,10-tetracarboxylic acid N,N'-dimethylimide are obtained in the form of the prepigment. 380 ml of quartz beads of 1 mm in diameter are initially taken in a 0.5 l stirred ball mill. Thereafter, 154 ml of chlorobenzene are added, and 20 g of the prepigment prepared as described above and introduced. The prepigment is milled for 1 hour at 40°C., the quartz beads are then removed by means of a sieve, and the pigment suspension is subjected to steam distillation to free it from chlorobenzene. The pigment is then filtered off under suction and dried at 80° C.

18.5 g of pigment are obtained; when this pigment is incorporated into finishes, high-hiding, red and pure shades are obtained.

EXAMPLE 2

30 g of perylene-3,4,9,10-tetracarboxylic dianhydride are introduced into 300 ml of water. After the mixture has been cooled to 0°–5° C., 47.1 g of a 42.5% strength aqueous monomethylamine solution are added dropwise in the course of 10 minutes. Stirring is then continued for 15 minutes at 0°–5° C., after which a solution of 17 g of calcium chloride in 56.6 ml of water is added dropwise, stirring is continued for 1 hour at 0°–5° C., and the mixture is heated to the boil for 2 hours and allowed to cool to 50° C. Thereafter, the pH is brought to 7–7.5 by adding 13.8 g of formic acid (98% strength), and the precipitate is filtered off under suction, washed chloride-free and dried at 80° C.

32.2 g of perylene-3,4,9,10-tetracarboxylic acid N,N'-dimethylimide are obtained in the form of the prepigment. 380 ml of quartz beads of 1 mm in diameter are initially taken in a 0.5 l stirred ball mill. Thereafter, 154 ml of xylene are added, and 20 g of the prepigment prepared as described above are introduced. The prepigment is milled for 1 hour at room temperature, the quartz beads are then removed by means of a sieve, and the pigment suspension is subjected to steam distillation to free it from xylene. The pigment is then filtered off under suction and dried at 80° C.

18. 6 g of pigment are obtained; when this pigment is incorporated into finishes, high-hiding, red and pure shades are obtained.

EXAMPLE 3

30 g of perylene-3,4,9,10-tetracarboxylic dianhydride are introduced into 600 ml of water. After the mixture has been cooled to 0°–5° C., 47.1 g of a 42.5% strength aqueous monomethylamine solution are added dropwise in the course fo 10 minutes. Stirring is then continued for 15 minutes at 0°–5° C., after which a solution of 17 g of calcium chloride in 56.6 ml of water is added dropwise, stirring is continued for 1 hour at 0°–5° C., and the mixture is heated to the boil for 2 hours and allowed to cool to 50° C. Thereafter, the pH is brought to 7–7.5 by adding 13.8 g of formic acid (98% strength), and the precipitate is filtered off under suction, washed chloride-free and dried at 80° C.

32.4 g of perylene-3,4,9,10-tetracarboxylic acid N,N'-dimethylimide are obtained in the form of the prepigment. 380 ml of quartz beads of 1 mm diameter are initially taken in a 0.5 l stirred ball mill. Thereafter 154 ml of o-dichlorobenzene are added, and 20 g of the prepigment prepared as described above are introduced. The prepigment is milled for 1 hour at room temperature in a stirred ball mill, the quartz beads are then removed by means of a sieve, and the pigment suspension is subjected to steam distillation to free it from o-dichlorobenzene. The pigment is then filtered off under suction and dried at 80° C.

18.4 g of pigment are obtained; when this pigment is incorporated into finishes, high-hiding, red and pure shades are obtained.

EXAMPLE 4

30 g of perylene-3,4,9,10-tetracarboxylic dianhydride are introduced into 300 ml of water. After the mixture has been cooled to 0°–5° C., 47.1 g of 42.5% strength aqueous monomethylamine solution are added dropwise in the course of 10 minutes. Stirring is then continued for 15 minutes at 0°–5° C., after which a solution of 17 g of calcium chloride in 56.6 ml of water is added dropwise, stirring is continued for 1 hour at 0°–5° C., and the mixture is heated to the boil for 2 hours and allowed to cool to 50° C. Thereafter, the pH is brought to 7–7.5 by adding 13.8 g of formic acid (98% strength), and the precipitate is filtered off under suction, washed chloride free and dried at 80° C.

32.2 g of perylene-3,4,9,10-tetracarboxylic acid N,N'-dimethylimide are obtained in the form of the prepigment. 1200 g of quartz beads of 2 mm diameter are initially taken in a 1 l porcelain vibratory mill. Thereafter, 240 ml of xylene are added and 30 g of the prepigment prepared as described above are introduced. The prepigment is treated in the vibratory mill for 6 hours, after which the quartz beads are removed by means of a sieve, and the pigment suspension is subjected to steam distillation to free it from xylene. The pigment is then filtered off under suction and dried at 80° C.

28.2 g of pigment are obtained; when this pigment is incorporated into finishes, high-hiding, red and pure shades are obtained.

We claim:

1. A process for the preparation of perylene 3,4,9,10-tetracarboxylic acid N,N'-dimethylimide in a high-hiding pigmentary form and a pure red shade, wherein a finely divided, dry perylene-3,4,9,10-tetracarboxylic acid N,N'-dimethylimide prepigment which is prepared in a conventional manner and has a crystallite size of <400 Å is treated with an organic solvent which is liquid in the treatment temperature range stated below and is selected from the series comprising saturated aliphatic brominated or chlorinated hydrocarbons, aromatic hydrocarbons and aromatic brominated or chlorinated hydrocarbons, in a mill or a disperser at temperatures from 0° C. to 100° C., the organic solvent is the distilled off and the perylene-3,4,9,10-tetracarboxylic acid, N,N'-dimethylimide pigment is isolated.

2. A process as claimed in claim 1, wherein the prepigment is treated with methylene chloride, toluene, xylenes, 1,2,3-trimethylbenzene, 1,2,4-trimethylbenzene, 1,3,5-trimethylbenzene, monochlorobenzene, or o-dichlorobenzene, 1,2,4-trichlorobenzene or bromobenzene.

3. A process as claimed in claim 1, wherein the prepigment is treated in a continuous or batchwise roll mill, vibratory mill or stirred ball mill.

* * * * *

UNITED STATES PATENT AND TRADEMARK OFFICE
CERTIFICATE OF CORRECTION

PATENT NO. : 4,797,162
DATED : January 10, 1989
INVENTOR(S) : Ernst Spietschka, Manfred Urban It is certified that error appears in the above-identified patent and that said Letters Patent is hereby corrected as shown below:

In column 4, line 43, "the" (second occurence, after "is") should read --then--.

Signed and Sealed this

Twenty-first Day of November, 1989

Attest:

JEFFREY M. SAMUELS

Attesting Officer     Acting Commissioner of Patents and Trademarks